United States Patent Office 2,804,389
Patented Aug. 27, 1957

2,804,389

PROCESS FOR TREATING AND PRESERVING MACERATED COFFEE

Louis Charles Tarasch, North Miami Beach, Fla.

No Drawing. Application September 23, 1954,
Serial No. 458,013

5 Claims. (Cl. 99—71)

This invention relates to a process for treating ground coffee to prevent deterioration thereof in a coffee brew. Coffee as is well known contains a fat called coffee wax. This wax is soluble in hot or boiling water. Therefore, under normal brew of coffee, a very considerable amount of this wax is liberated into the brewed coffee. This wax can be noticed when brewed or percolated coffee stands for a relatively short period of time and is noticeable as floating oil rings on the top layer of the brew. This wax is commonly recognized as the reason why brewed coffee becomes rancid in a relatively short period of time, sometimes within 15 to 20 minutes after brewing or percolating. The rancid wax is generally recognized as being indigestible and causes so-called heartburn or acid stomach.

The process hereinafter described is concerned primarily with the production of a coffee brew which is relatively free of any wax or contains very little of it, resulting in a relatively fat-free coffee. The coffee when brewed in accordance with the following process is wholly digestible, of a finer aroma and capable of preserving itself without turning rancid for a relatively long period of time and permits of a desirable quantity of the coffee to be brewed, stored and again re-heated as desired and retains its aroma and freshness. It will be quite evident that the benefits are that there is no waste of unused coffee, permits a relatively large amount of coffee to be brewed at one time for subsequent re-heating or for use as iced coffee. The brew possible with this process enables the manufacture or brewing of coffee on a large scale in a commercial manner to be delivered from door to door, much in the same manner as milk is presently delivered.

The process resides in extracting the coffee by a cold process with the addition of some material capable of hardening the wax in the cells of the coffee grind, making the wax insoluble thereafter. The process consists primarily of macerating the coffee grind in the liquid in a suitable container in such manner that the coffee remains submerged within the liquid to a point just beneath the water level or surface so that extracted materials settle to the bottom gradually until all or substantially all is extracted. To facilitate this extraction, any suitable means may be provided for the rotation of a suitable basket containing the coffee grind. As before pointed out, the liquid used must be initially cold, therefore solidifying the wax to prevent its extraction from the grind and preventing its entry into the liquid. To provide for this solidification and to make a more complete defatted liquid, there may be added to the liquid before macerating certain chemicals which harden the wax, making it insoluble in the liquid. The chemicals employed for hardening the wax and which have been found most successful for this purpose comprise tartaric acid, sodium chloride and magnesium sulphate.

As an example, for a predetermined quantity of coffee and where distilled water is employed, the following proportions have been found highly effective:

To 1 gallon of cold distilled water, add
5 grains of tartaric acid and/or
20 grains of sodium chloride and/or
30 grains of magnesium sulphate The several elements in the above noted quantities, either individually or in combination, are placed within the water in a suitable brew container, after which a suitable coffee container, usually of perforated form, is filled with ground coffee in a recognized quantity for brewing a particular strength of liquid, and the container is then submerged into the cold liquid to a point just below the surface of the water. The chemicals combined with the cold water immediately harden the fatty wax within the cells of the coffee grind. The maceration then causes the soluble elements within the grind to be extracted and dispersed throughout the liquid and, since the fatty wax has become insoluble, this will remain in the grind and not be liberated into the brew. Through this process, all of the flavor and aroma of the coffee will be substantially extracted and produce a brew that is substantially wholly free from the objectionable wax commonly noted in coffee brewed under conventional methods.

After the coffee has been macerated as above indicated, the ground coffee container is removed and the grounds dispensed with, since all of the desirable elements have been extracted therefrom. Since the brew resulting from the above process has a relatively long life, any brew not used at the moment may be bottled and refrigerated for future consumption. It has been found that by employing a suitable container that one pound of ground macerated coffee will produce approximately 1¼ gallons of brew.

The process further readily lends itself to the production of a fluid extract wherein 1 pound of ground coffee to 1½ pints of water will, after complete maceration, settle to 16 ounces of concentrated liquid. This concentrated liquid may, if desired, be subsequently dehydrated to produce a powdered extract, much in the same manner as extracts presently in use on the market. It is to be understood of course that in producing the fluid extract, the various chemicals in their proper proportions as above noted may be employed in the cold liquid.

It will be therefore apparent from the foregoing that a new and novel process has been employed that will permit the maceration of ground coffee in a manner that greatly prolongs the useful life thereof against rancidity and which retains its flavor and aroma, even after repeated heating. It is contemplated that the chemicals in their proper proportions may be packaged and dispensed either for use in the commercial production of the coffee or for the average household use.

It is to be understood that the invention is not limited to the precise proportions indicated, but that changes are contemplated that readily fall within the spirit of the invention as determined by the scope of the subjoined claims.

Having described my invention, what I claim as new and desire to secure by Letters Patent, is:

1. The process of macerating a ground coffee to prevent subsequent rancidity and wherein the ground coffee contains a normally soluble fatty wax, that consists in adding to substantially 1½ pints of cold water a wax solidifying agent taken from the group consisting of tartaric acid, sodium chloride and magnesium sulphate, immersing substantially 1 pound of ground coffee supported in a perforated container to a point just below the surface of the water and permitting the maceration to continue for a predetermined time to extract and diffuse the essence and soluble elements of the ground coffee free of the solidified fatted wax and in the absence of heat.

2. The process as defined in claim 1, wherein the wax solidifying agent comprises tartaric acid in the proportion of 5 grains to 1 gallon of cold water.

3. The process as defined in claim 1, wherein the wax solidifying agent comprises sodium chloride in the proportions of 20 grains to 1 gallon of cold water.

4. The process as defined in claim 1, wherein the wax solidifying agent comprises magnesium sulphate in the proportions of 30 grains to 1 gallon of cold water.

5. The hereindescribed process of treating ground coffee for the preparation of a concentrated coffee liquid free of rancid creating ingredients, and wherein the ground coffee contains a normally soluble fatty wax, that comprises the immersion of substantially 1 pound of supported ground coffee into substantially 1½ pints of cold water wherein has been placed a wax solidifying agent taken from the group consisting of tartaric acid, sodium chloride and magnesium sulphate, macerating the mixture for a predetermined time to extract the coffee soluble essence free of rancid forming ingredients and producing substantially 16 ounces of concentrated liquid.

References Cited in the file of this patent
UNITED STATES PATENTS

| Number | Name | Date |
|---|---|---|
| 229,697 | Gue et al. | July 6, 1884 |
| 1,821,551 | Kennedy | Sept. 1, 1931 |
| 1,891,383 | Giffen et al. | Dec. 20, 1932 |
| 2,084,839 | Dubois | June 22, 1937 |
| 2,123,207 | Rosenthal | July 12, 1938 |
| 2,230,031 | Fisher | Jan. 28, 1941 |

FOREIGN PATENTS

| Number | Country | Date |
|---|---|---|
| 16,590 | Great Britain | Aug. 25, 1903 |